3,388,175
PURIFICATION OF 2,2,2-TRIFLUORO-1-
CHLORO-1-BROMOETHANE
David John Viney, Runcorn, England, assignor to Imperial Chemical Industries Limited, London, England, a corporation of Great Britain
No Drawing. Filed Dec. 20, 1965, Ser. No. 515,248
Claims priority, application Great Britain, Jan. 1, 1965, 55/65
10 Claims. (Cl. 260—653)

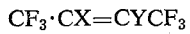

ABSTRACT OF THE DISCLOSURE

There is provided a process for the purification of 2,2,2-trifluoro-1-chloro-1-bromoethane, commonly known as halothane, wherein impurities of the formulae $$CF_3 \cdot CX=CYCF_3$$

and $CF_2=CClZ$ wherein X is hydrogen bromine or chlorine, Y is bromine or chlorine and Z is hydrogen, bromine, chlorine and fluorine are removed. The halothane while in the liquid state is purified by contacting the halothane with a solution of a metal permanganate which removes the said impurities.

This invention relates to a purification process and more particularly it relates to a process for the purification of 2,2,2-trifluoro-1-chloro-1-bromoethane hereinafter referred to as halothane.

Halothane is a valuable inhalation anaesthetic used for the production of anaesthesia in men and in animals. However, depending on the manner of manufacture of halothane, it may contain small amounts of certain impurities and it is an object of the present invention to remove such impurities.

According to the present invention we provide a process for the purification of impure halothane containing as impurity at least one compound of the formula $$CF_3 \cdot CX=CY \cdot CF_3$$

wherein X stands for hydrogen, bromine or chlorine and Y stands for bromine or chlorine and/or at least one compound of the formula $CF_2=CClZ$ where Z is hydrogen, bromine, chlorine or fluorine which comprises intimately contacting said impure halothane in the liquid phase with a metal permanganate and recovering the purified halothane.

It is to be understood that any compound of the above-stated formula $CF_3 \cdot CX=CY \cdot CF_3$ may be present as impurity in the form of a cis isomer or a trans isomer or a mixture thereof.

The permanganate treatment can be carried out using aqueous, non-aqueous solvents, particularly organic solvents (for example acetone), or mixtures of such solvents, which are not appreciably attacked by permanganate. The use of organic solvents can increase the rate of attack on the impurities in the halothane but can also complicate subsequent isolation of the purified halothane, however, so it is generally preferred to use the permanganate in the form of an aqueous solution.

The relative proportions of halothane and aqueous solution may be varied considerably, and the optimum proportions in any particular circumstances will depend upon such factors as the thoroughness of mixing, the particular impurities present and the amounts of these which have to be removed, and the temperature of treatment. Suitable proportions are in the range 1:5 to 5:1 by volume, though proportions outside this range may be used if desired. Proportions of about 1:1, i.e. approximately equal volumes of halothane and aqueous solution, are usually found to be suitable and convenient.

The permanganate may be in particular an alkali metal or alkaline earth metal permanganate, and the permanganate solution may be acid, neutral or alkaline. Of the latter a neutral or alkaline solution is perferred. If the solution is to be alkaline, this may be achieved most conveniently by addition of an alkali metal hydroxide, though other bases may be used if desired, for example, alkaline earth metal hydroxides or ammonia. If the solution is to be acid, this may be conveniently achieved by addition of, for example, sulphuric acid.

Useful results can be obtained when using up to 10% by weight in the aqueous phase of sodium hydroxide or potassium hydroxide although higher concentrations than this could be used if desired. However lower rather than higher proportions than 10% by weight of NaOH or KOH are preferred and it is particularly preferred to employ concentrations of up to 2% by weight NaOH or KOH, for example 0.1% to 2% by weight NaOH, in the aqueous phase.

Sodium and potassium permanganates are particularly useful metal permanganates to be used in the process of the invention. Useful results may be obtained with various concentrations of permanganate in the aqueous phase. For example, good results are obtained when using a substantially saturated solution of potassium permanganate in the aqueous phase, that is about 60 g./l. potassium permanganate at ambient temperature.

Preferably the inpure halothane is vigorously agitated with the aqueous solution of the permanganate. Thus in one suitable method the impure halothane is vigorously agitated with an aqueous solution of the permanganate at a temperature ranging from 0° C. to the boiling point of the mixture, for example, at ambient temperature, the agitation is stopped and the mixture is allowed to separate into two distinct layers, and the lower halothane layer is fractionally distilled.

The process may be carried out in a batch or continuous manner. Again the present process may be used in comjunction with other purification procedures, for example, those based on fractional distillation which can be carried out before or after the present process.

The following example illustrates but does not limit the invention. All parts are to be read as parts by weight.

Example

The following table illustrates the removal of various impurities from halothane under a variety of conditions wherein the halothane was vigorously agitated with an aqueous solution of permanganate. Some of the impurities were purposely added and sometimes in large amounts in order to illustrate the efficiency of the process. The purified halothane was analysed by gas/liquid chromatography. The impurities were:

A. 2-chloro-1,1,1,4,4,4-hexafluoro butene-2 (trans).
B. 2-chloro-1,1,1,4,4,4-hexafluoro butene-2 (cis),
C. 2-bromo-1,1,1,4,4,4-hexafluoro butene-2 (trans).
D. 2,3-dichloro-1,1,1,4,4,4-hexafluoro butene-2 (cis).
E. 2,3-dichloro-1,1,1,4,4,4-hexafluoro butene-2 (trans).
F. 1-chloro-1-bromo-2,2-difluoro ethylene.
G. 1-chloro-2,2-difluoro ethylene.

| | Halothane | | Permanganate Solution | | | | Temperature, °C. | Time, hours | Total Impurities, Remaining, p.p.m. |
|---|---|---|---|---|---|---|---|---|---|
| | Parts | Impurities present | Permanganate | | Water, Parts | Additive | | | |
| | | | Cation | Parts | | Compound | Parts | | | |
| 1 | 100 | 50 p.p.m. C | Ca | 5 | 50 | Nil | Nil | 22 | 2 | <5 |
| 2 | 145 | 95 p.p.m. C | K | 4.5 | 75 | NaOH | 1.5 | 0 | 1.5 | <5 |
| 3 | 190 | 35 p.p.m. A / 190 p.p.m. C | K | 3 | 100 | H₂SO₄ | 2 | 48 | 3 | <5 |
| 4 | 200 | 60 p.p.m. A / 95 p.p.m. C | K | 3 | 100 | NH₃ | 1 | 23 | 2.5 | <5 |
| 5 | 200 | 60 p.p.m. A / 95 p.p.m. C | Ba | 4 | 100 | Ba(OH)₂ | 2 | 22 | 2.5 | <5 |
| 6 | 100 | 60 p.p.m. A / 95 p.p.m. C | K | 5 | 108 | KOH | 0.5 | 50 | 1 | <5 |
| 7 | 8,000 | 110 p.p.m. A / 185 p.p.m. C | K | 255 | 4,250 | NaOH | 85 | 20 | 1 | <5 |
| 8 | 200 | 100 p.p.m. A / 170 p.p.m. C / 210 p.p.m. D / 150 p.p.m. E | Ba | 3 | 54 | NaOH | 1 | 21 | 8 | <5 |
| 9 | 200 | 100 p.p.m. A / 170 p.p.m. C / 210 p.p.m. D / 150 p.p.m. E | NA | 4 | 108 | NaOH | 2 | 21 | 7 | <5 |
| 10 | 589,000 | 120 p.p.m. A / 130 p.p.m. C / 220 p.p.m. D / 110 p.p.m. E | K | 14,000 | 300,000 | NaOH | 4,000 | 27 | 5.5 | <10 |
| 11 | 200 | 75 p.p.m. G | K | 4 | 100 | NaOH | 1.5 | 22 | 0.25 | <5 |
| 12 | 100 | 65 p.p.m. F | K | 1.5 | 27 | NaOH | 0.5 | 21 | 0.75 | <5 |
| 13 | 100 | 70 p.p.m. A / 375 p.p.m. C / 725 p.p.m. D / 620 p.p.m. E / 25 p.p.m. F | NA | 10 | 100 | NaOH | 2 | 50 | 5 | <5 |
| 14 | 589,000 | 205 p.p.m. A / 70 p.p.m. B / 125 p.p.m. C / 75 p.p.m. F | K | 12,315 | 300,000 | NaOH | 4,870 | 22 | 2 | <5 |

What I claim is:

1. A process for the purification of impure 2,2,2-trifluoro-1-chloro-bromoethane containing as impurity at least one compound selected from the group consisting of a compound of the formula $CF_3 \cdot CX=CYCF_3$ wherein X stands for hydrogen, bromine or chlorine and Y stands for bromine or chlorine and a compound of the formula $CF_2=CClZ$ where Z is hydrogen, bromine, chlorine or fluorine and mixtures thereof, which comprises intimately contacting said impure 2,2,2-trifluoro-1-chloro-bromoethane in the liquid phase with solution of a metal permanganate, at a temperature from about 0° C. up to the boiling point of the mixture and recovering the purified 2,2,2-trifluoro-1-chloro-bromoethane.

2. A process as claimed in claim 1 in which an aqueous solution of the metal permanganate is employed.

3. A process as claimed in claim 2 in which the solution is neutral or alkaline.

4. A process as claimed in claim 3 in which up to 10% by weight sodium or potassium hydroxide is present in the aqueous phase.

5. A process as claimed in claim 4 in which up to 2% by weight sodium or potassium hydroxide is present in the aqueous phase.

6. A process as claimed in claim 1 in which sodium or potassium permanganate is employed as the metal permanganate.

7. A process as claimed in claim 6 in which a substantially saturated solution of potassium permanganate in the aqueous phase is employed.

8. A process as claimed in claim 1 in which the purification process is carried out at ambient temperature.

9. A process as claimed in claim 2 in which the relative proportions of 2,2,2-trifluoro-1-chloro-1-bromoethane to aqueous solution of permanganate is in the range 1:5 to 5:1 by volume.

10. A process as claimed in claim 1 which comprises vigorously agitating the impure 2,2,2-trifluoro-1-chloro-bromoethane with an aqueous alkaline solution of the permanganate at a temperature ranging from 0° C. to the boiling point of the mixture, stopping the agitation and allowing the mixture to separate into two distinct layers, and fractionally distilling the lower 2,2,2-trifluoro-1-chlorobromoethane layer.

References Cited

UNITED STATES PATENTS 2,999,885  9/1961  Heberling _____ 260—653

DANIEL D. HORWITZ, *Primary Examiner.*